United States Patent
Morris et al.

(10) Patent No.: US 6,500,282 B2
(45) Date of Patent: Dec. 31, 2002

(54) GOLD-INDIUM INTERMETALLIC COMPOUND, SHAPE MEMORY ALLOYS FORMED THEREFROM AND RESULTING ARTICLES

(75) Inventors: Robert C. Morris, Flanders, NJ (US); Dave Narasimhan, Flemington, NJ (US); Raghib Hasan, Pomona, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/784,966

(22) Filed: Feb. 16, 2001

(65) Prior Publication Data

US 2001/0026770 A1 Oct. 4, 2001

Related U.S. Application Data

(60) Provisional application No. 60/192,707, filed on Mar. 28, 2000.

(51) Int. Cl.[7] .............................................. C22C 28/00
(52) U.S. Cl. ...................... 148/402; 420/555; 148/563
(58) Field of Search ................................ 420/555, 507; 148/402, 563

(56) References Cited

U.S. PATENT DOCUMENTS

| | | | | |
|---|---|---|---|---|
| 3,495,972 A | * | 2/1970 | Baum | ......................... 420/555 |
| 3,865,557 A | * | 2/1975 | Andres et al. | ............... 420/555 |
| 3,902,898 A | * | 9/1975 | Denhard, Jr. et al. | ......... 420/42 |
| 4,690,799 A | | 9/1987 | Yoshida | ...................... 420/507 |
| 5,108,523 A | | 4/1992 | Peterseim et al. | ........... 148/402 |
| 5,203,931 A | | 4/1993 | O'Keefe | ...................... 148/518 |

OTHER PUBLICATIONS

T:B:Massalski: "Binary Alloy Phase Diagrams, vol. 1, Ac–Au to Fe–Rh, pp. 268, 2370 and 271" 1986, ASM, Ohio, US XP002177614 p. 270.

R. Castanet et al: "Thermodynamic Investigations of Liquid Gold–Indium Alloys", Zeitschrift Fur Metallkunde, vol. 72, No. 3, 1981, pp. 176–180, XP002177613, Dr. Riederer Verlag GMBH. Stuttgart., DE ISSN: 0044–3093, last two sentences, p. 176 Col. 2.

Patent Abstracts of Japan, vol. 004, No. 183 (M–047), (Dec. 17, 1980) & JP 55 129661 A (Toshiba Corp.), (Oct. 7, 1980), abstract.

Patent Abstracts of Japan, vol. 009, No. 070 (M–637), (Mar. 30, 1985) & JP 59 200869 A (Touhoku Kinzoku Kogyo KK), (Nov. 14, 1984) abstract.

* cited by examiner

*Primary Examiner*—Roy King
*Assistant Examiner*—Harry D. Wilkins

(57) ABSTRACT

A superelastic alloy exhibiting shape memory or pseudoelastic it properties contains about 46.17 weight percent Au and about 53.83 weight percent In. Such alloys containing the superelastic Au—$In_2$ intermetallic compound which exhibits elasticity can be formed into a gasket or seal that can be deformed at low stress levels while additionally having corrosion resistant properties.

7 Claims, 1 Drawing Sheet

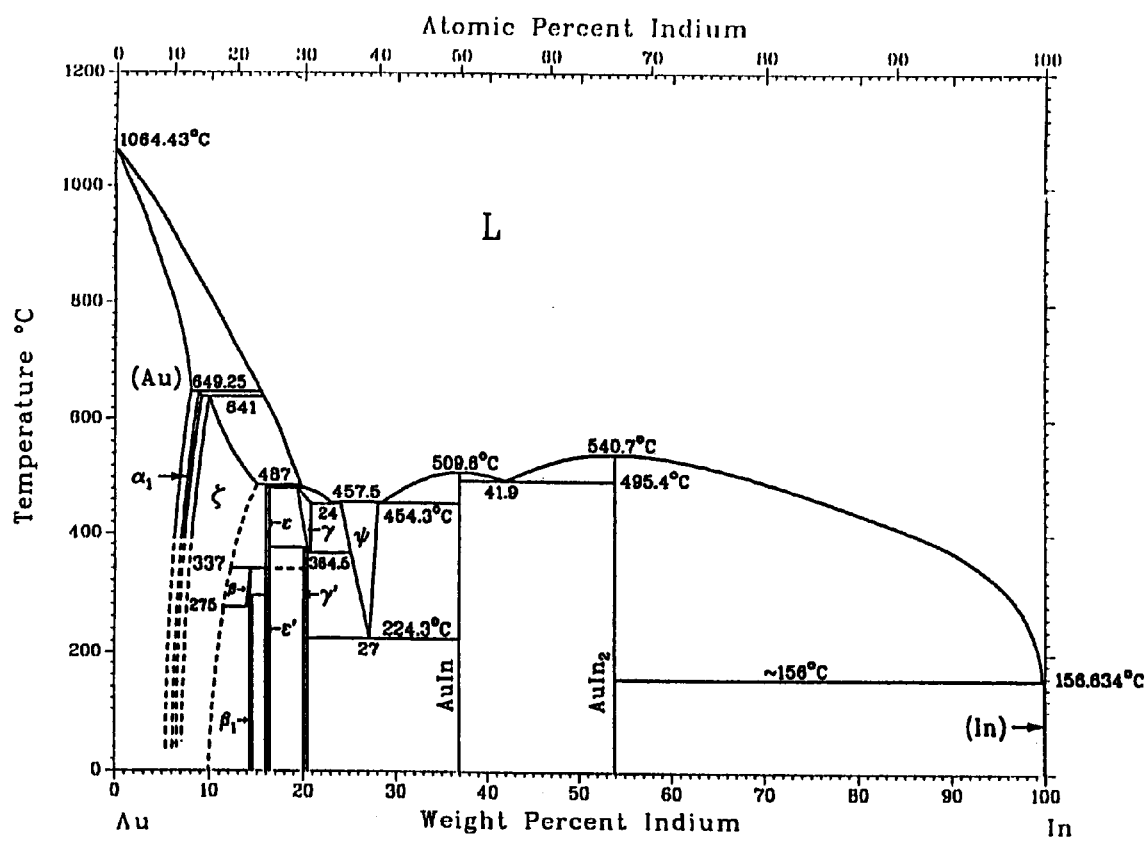

US 6,500,282 B2

GOLD-INDIUM INTERMETALLIC COMPOUND, SHAPE MEMORY ALLOYS FORMED THEREFROM AND RESULTING ARTICLES

CROSS-REFERENCE TO RELATED APPLICATIONS

This application claims priority to U.S. Provisional Application Ser. No. 60/192,707, filed Mar. 28, 2000 and incorporated by reference herein.

BACKGROUND

1. Technical Field

The present invention relates to an intermetallic compound possessing superelastic properties, shape memory alloys formed therefrom, and the resulting shape memory articles.

2. Background of Related Art

Alloys which are capable of transforming between martensitic and austenitic parent phases are generally able to exhibit a shape memory effect. The transformation between phases may be caused by a change in temperature. For example, a shape memory alloy in the martensitic phase will begin to transform to the austenitic phase when its temperature rises above the austenite start temperature, $A_s$, and the transformation will be complete when the temperature rises above the austenite finish temperature, $A_f$. The forward transformation will begin when the temperature drops below the martensite start temperature, $M_s$, and will be complete when the temperature drops below the martensite finish temperature, $M_f$. The temperatures $M_s$, $M_f$, $A_s$ and $A_f$ define the thermal transformation hysteresis loop of a shape memory alloy.

Under certain conditions, shape memory alloys exhibit pseudoelasticity, which does not rely on temperature change in order to accomplish shape change. A pseudoelastic alloy is capable of being elastically deformed far beyond the elastic limits of conventional metals. Certain alloys, however, are capable of exhibiting pseudoelasticity of two types.

A first type of pseudoelasticity, "superelasticity" (also sometimes referred to as non-linear pseudoelasticity), arises in appropriately treated alloys while they are in their austenitic parent phase at a temperature which is greater than $A_s$ and less than $M_d$ ($M_d$ is the maximum temperature at which the transformation to the martensitic phase can be induced by the application of stress). Superelasticity can be achieved when the alloy is annealed at a temperature which is less than the temperature at which the alloy is fully recrystallized. Alternative methods of creating superelasticity in shape memory alloys are, for example, solution treating and ageing, alloying, etc. An article may be provided with a desired configuration by holding it in that configuration during annealing, or during solution treatment and ageing. An article formed from an alloy which exhibits superelasticity can be deformed substantially reversibly up to 11 percent or even more.

A second type of pseudoelasticity is "linear pseudoelasticity". In contrast to superelasticity, "linear pseudoelasticity" is believed not to be accompanied by a phase change. It is exhibited by shape memory alloys which have been cold worked in the martensitic phase, but have not been annealed in the manner discussed above for superelastic behavior. An article formed from an alloy which exhibits linear pseudoelasticity can be deformed substantially reversibly by 4 percent or even more.

Examples of known metallic materials used to form shape memory alloys known in the prior art include nickel-titanium (Nitinol), nickel-titanium-vanadium. nickel-titanium-zirconium, nickel-titanium-zirconium-copper, indium-thallium, and gold-copper-zinc. These alloys have been employed in a wide variety of mechanical, electrical and medical/dental applications, e.g., connectors, couplings, window openers, valve switches, heat-actuated water sprinklers, safety switches, and orthodontal appliances. However, due to their high strength properties, these alloys cannot be deformed at low stress levels such as that encountered in, for example, gaskets or seals. In the case of gaskets, the deformation should be restricted to the gasket and not the flanges. Since these alloys possess high strength and/or high hardness, permanent deformation of the flanges will result. Therefore, these alloys would not be useful when employed as a gasket or seal.

It would therefore be desirable to have a shape memory alloy which can be deformed at low stress levels therefore making the alloys useful as gaskets or seals.

SUMMARY

We have discovered that intermetallic compounds derived from Au—$In_2$ exhibit superelasticity such that the intermetallic compounds possess shape memory characteristics when deformed at low stress levels yet also provide sufficient strength to maintain its shape when employed as a gasket or seal. In one embodiment, an Au—$In_2$ intermetallic compound possessing shape memory characteristics is provided which comprises Au and In in a near atomic ratio of about 1:2 which has been heated to a predetermined temperature to melt and form a liquid alloy mixture and allowed to cool at room temperature.

In a second embodiment, a shape memory alloy is provided which includes at least a first phase having shape memory properties containing Au and In with additional alloying elements such as copper and/or nickel and a second inactive carrier phase containing elements selected from the group consisting of Au, In, Ni and Cu. These alloys are advantageously formed as a gasket or seal which possesses pseudoelastic, i.e., superelastic, properties. The seals are particularity useful for liquid oxygen systems.

BRIEF DESCRIPTION OF THE DRAWING

A more complete understanding of the present invention will become readily apparent from the following description together with FIG. 1 which is an indium-gold equilibrium phase diagram showing the intermetallic compound Au—$In_2$.

DETAILED DESCRIPTION

We have discovered that superelastic Au—$In_2$ intermetallic compounds and alloys are uniquely suited for use as gaskets and/or seals. In their uncompressed state the Au—$In_2$, intermetallic compounds are very flexible and compliant so that they can be deformed at room temperature by as much as about 10 percent without fracture and is completely recoverable. This property enables the Au—$In_2$ intermetallic compounds to possess the ability to retain the dimensions of the resulting gasket oriseal when applying low stress levels to the gasket or seal, e.g., at levels below about 3,000 psi. Thus, the resulting gasket or seal will be able to conform to irregular or mismatched surfaces. The gasket or seal materials are normally in the form of sheets but may also be in the form of rods, squares or other objects.

The Au—$In_2$ intermetallic compound is necessary for obtaining the shape memory characteristics when formed as a gasket or seal. The Au—In$_2$ phase has a composition of about 46.17 weight percent Au and about 53.83 weight percent In. Geherally, when forming an alloy containing the Au—In$_2$ intermetallic compound for use in the gaskets or seals exhibiting shape memory characteristics, Au will ordinarily be present in an amount of at least about 42 to about 50 weight percent and In will ordinarily be present in an amount of at least about 50 to about 58 weight percent. As shown in FIG. 1, alloys formed with an indium content greater than about 53.83 percent will contain deformable indium as a second phase carrying the Au—In$_2$ intermetallic composition while alloys formed with an indium content less than 53.83 percent will contain both Au—In$_2$ shape memory intermetallic phase and Au—In intermetallic phase, which does not exhibit shape memory effects. By employing Au and In in the foregoing amounts the Au—In$_2$ intermetallic compound and alloys based thereon can advantageously be formed by conventional metallurgy methods known to one skilled in the art, e.g., placing powders of Au and In in the aforementioned amounts in a crucible and then heating the powders in a furnace to a temperature of at least about 540° C. to dissolve the powders into the liquid state, i.e., a solution, as shown in FIG. 1. The molten intermetallic compound and/or alloy containing the Au—In$_2$ intermetallic compound is then allowed to cool at room temperature into the pseudoelastic phase wherein Au and In reacts with one another such that the Au—In$_2$ intermetallic compound or alloy containing the Au—In$_2$ intermetallic compound is formed.

When forming a shape memory alloy, it is particularly advantageous to form an alloy possessing a first phase having shape memory properties and a second inactive carrier phase. The first phase having shape memory properties will contain Au and In in an amount ranging from about 53 to about 56 weight percent In, the balance being Au and preferably from about 54 to about 55 In, the balance being Au. Additions of transition elements such as Cu, Ni and the like and combinations thereof may also be incorporated in the active shape memory phase providing advantages of compositional variability of the intermetallic phase in addition to changes in the mechanical properties of the shape memory phase such as, for example, elastic modulus, compressibility, etc.

The second inactive carrier phase will contain some dissolved Au in In and other added alloying elements such as, for example, Cu, transition metals, e.g., Ni, and the like and combinations thereof. The overall amount of the second inactive carrier phase should be restricted to about 0–50 percent volume fraction of the overall alloy composition. At small second phase volume fraction, the active shape memory first phase touches each other providing limited resilience or ability to match the contour of the irregular or mismatched surfaces, e.g., flanges. At high volume fraction of the second phase, e.g., amounts greater than 50 percent volume fraction, the behavior of the alloy will be controlled by the flow properties of the second phase and may extrude under gasket load. Generally, the contents for the second inactive phase will contain, under preferred conditions, about 0 to about 0.1 weight percent Au, about 90 to about 100 weight percent In, and from about 0 to about 10 weight percent copper and/or nickel and more preferably from about 0 to about 0.05 weight percent Au, about 95 to about 100 weight percent In and from about 0 to about 5 weight percent copper and/or nickel.

The Au—In$_2$ intermetallic compound and/or shape memory alloys of the present invention can be formed into a gasket or seal by known methods including, but not limited to, machining, casting, injection molding and powder metallurgy techniques, e.g., by pressing and sintering off preatomized powders of Au—In alloy or mixtures of fine powders of Au and In which are reacted in the solid state sintering, and are particularly useful as a gasket for flanges and as a sealing element for, e.g., a liquid oxygen environment. However, it is further contemplated that the Au—In$_2$ intermetallic compound and/or shape memory alloy of this invention can be useful in other applications such as, for example, radiopaque surgical stents and guide wires, dental prosthodontal and orthodontal appliances, thermal switches, electrical contacts of various kinds, actuators and motors, mechanical locks, belleville washers, etc.

The resulting gasket or seal formed from the Au—In$_2$ intermetallic compound and/or shape memory alloys will also be intrinsically corrosion resistant by employing gold, which is one of the least reactive elements, and indium which forms a passivating surface oxide when exposed to air or oxygen. If desired the corrosion resistance of the resulting gasket or seal can be further increased by techniques known in the art, e.g., by immersing the gasket or seal in a solution of mineral acid such as HCl to dissolve and substantially remove any indium and other elements present at or near the surface of the resulting gasket or seal leaving a surface treatment which will impart the corrosion resistance of pure gold and render any articles formed therefrom biocompatible.

The following non-limiting example is illustrative of a Au—In$_2$ intermetallic compound in accordance with the present invention.

EXAMPLE

An Au—In$_2$ intermetallic compound was prepared by placing 45 weight percent gold in powder form and 55 weight percent indium in powder form in a crucible and heating the mixture in a furnace at a temperature between 700–800° C. until the mixture melted and formed a solution of Au—In$_2$. The Au—In solution was allowed to cool at room temperature and an Au—In$_2$ intermetallic compound was formed.

The Au—In$_2$ intermetallic compound was then formed into a small right circular cylinder by injection molding and subjected to a compressive strain of 10 percent using standard techniques. Upon unloading, the specimen was found to recover more than half of the applied strain elastically. This behavior is typical of a superelastic or shape memory alloy.

Although the invention has been described in its preferred form with a certain degree of particularity, obviously many changes and variations are possible therein and will be apparent to those skilled in the art after reading the foregoing description. It is therefore to be understood that the present invention may be presented otherwise than as specifically described herein without departing from the spirit and scope thereof.

What is claimed is:

1. A method for fabricating an article exhibiting shape memory or pseudo-elastic properties comprising the step of deforming an Au—In alloy containing about 46.17 weight percent Au and about 53.83 percent weight In at low stress levels.

2. The method in accordance with claim 1 wherein said article is a gasket or seal.

3. The method in accordance with claim 2 further comprising exposing at least one surface of said gasket or seal to mineral acid to increase the corrosion resistance of said gasket or seal.

4. The method of claim 1 wherein said alloy also contains one or more transition elements selected from the group consisting of Cu and Ni.

5. The method of claim 1 wherein said alloy also contains an inactive carrier phase containing one or more elements selected from the group consisting of Au, In, Cu, and Ni.

6. A gasket or seal comprising a superelastic Au—In alloy exhibiting shape memory or pseudo-elastic properties, said alloy comprising about 46.17 weight percent Au and about 53.17 weight percent In and having been deformed at a low stress level.

7. A gasket or seal comprising a superelastic alloy exhibiting shape memory or pseudo-elastic properties and comprising a shape memory phase comprising about 46.17 weight percent Au and about 53.17 weight percent In and a carrier phase containing one or more elements selected from the group consisting of Au, In, Cu, and Ni.

* * * * *

UNITED STATES PATENT AND TRADEMARK OFFICE
CERTIFICATE OF CORRECTION

PATENT NO.    : 6,500,282 B2
DATED         : December 31, 2002
INVENTOR(S)   : Robert C. Morris et al.

It is certified that error appears in the above-identified patent and that said Letters Patent is hereby corrected as shown below:

Column 4,
Lines 60 and 61, replace "low stress levels" with -- a stress level below 3,000 psi --.

Column 5,
Line 10, replace "53.17" with -- 53.83 -- and
Lines 10 and 11, replace "low stress level" with -- stress level below 3,000 psi. --.

Column 6,
Line 4, replace "53.17" with -- 53.83 --.

Signed and Sealed this

First Day of July, 2003

JAMES E. ROGAN
*Director of the United States Patent and Trademark Office*